United States Patent [19]
Earl

[11] 3,790,110
[45] Feb. 5, 1974

[54] AIR CUSHION TYPE UNDERCARRIAGE

[75] Inventor: T. Desmond Earl, Buffalo, N.Y.

[73] Assignee: Textron Inc., Providence, R.I.

[22] Filed: May 25, 1972

[21] Appl. No.: 257,005

[52] U.S. Cl............. 244/110 H, 180/124, 180/128, 244/102 R
[51] Int. Cl............................................. B60v 3/08
[58] Field of Search........ 244/110 H, 110 R, 110 A, 244/102 R, 101, 100 A, 100 R, 115, 17.17, 12 R; 180/116–128, 119, 124, 128; 188/5

[56] References Cited
UNITED STATES PATENTS

| | | | |
|---|---|---|---|
| 3,524,517 | 8/1970 | LaFleur | 180/124 |
| 3,116,897 | 1/1964 | Theed | 180/125 X |
| 3,272,272 | 9/1966 | Hall et al. | 180/128 X |
| 3,414,077 | 12/1968 | Earl | 180/128 |

Primary Examiner—Duane A. Reger
Assistant Examiner—Paul E. Sauberer
Attorney, Agent, or Firm—Bean & Bean

[57] ABSTRACT

An improved ground-run deceleration and landing acquisition and temporary hold-down system for aircraft equipped with an air cushion type undercarriage. The invention employs means for the rapid withdrawal of air from the cushion cavity, whereby the time to decelerate the airplane is greatly decreased, and whereby an improved landing acquisition and temporary on-board hold-down facility is provided. The invention, therefore, has particular application to the problem in association with VTOL aircraft of "acquiring" and holding to a firm landing on pitching/rolling landing pads, and/or incidental to landings under adverse surface wind conditions.

9 Claims, 8 Drawing Figures

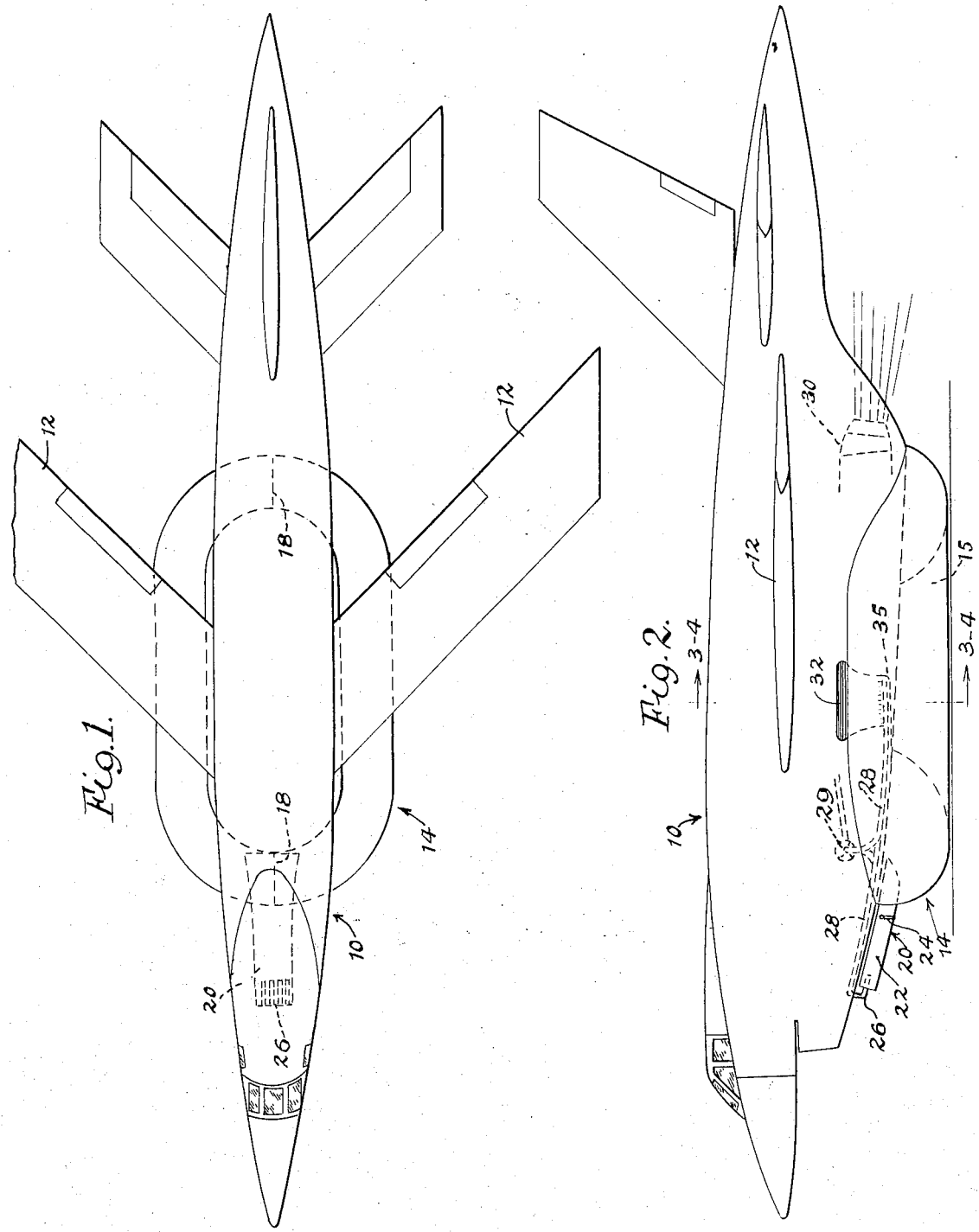

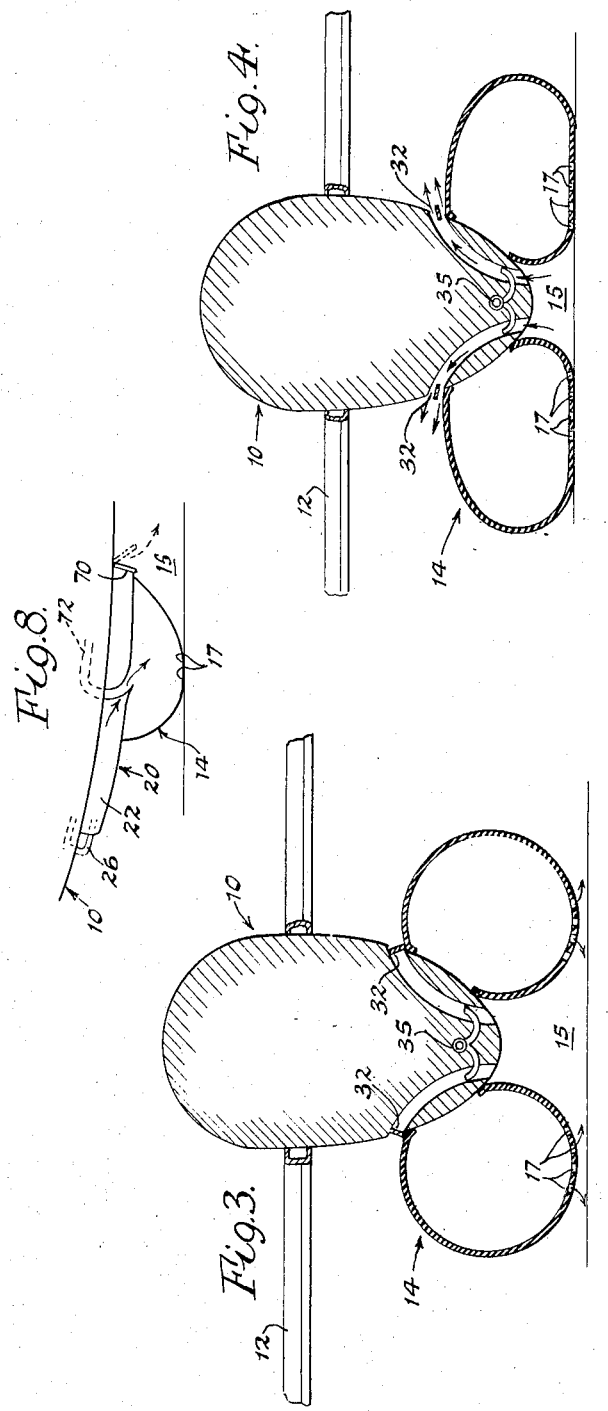

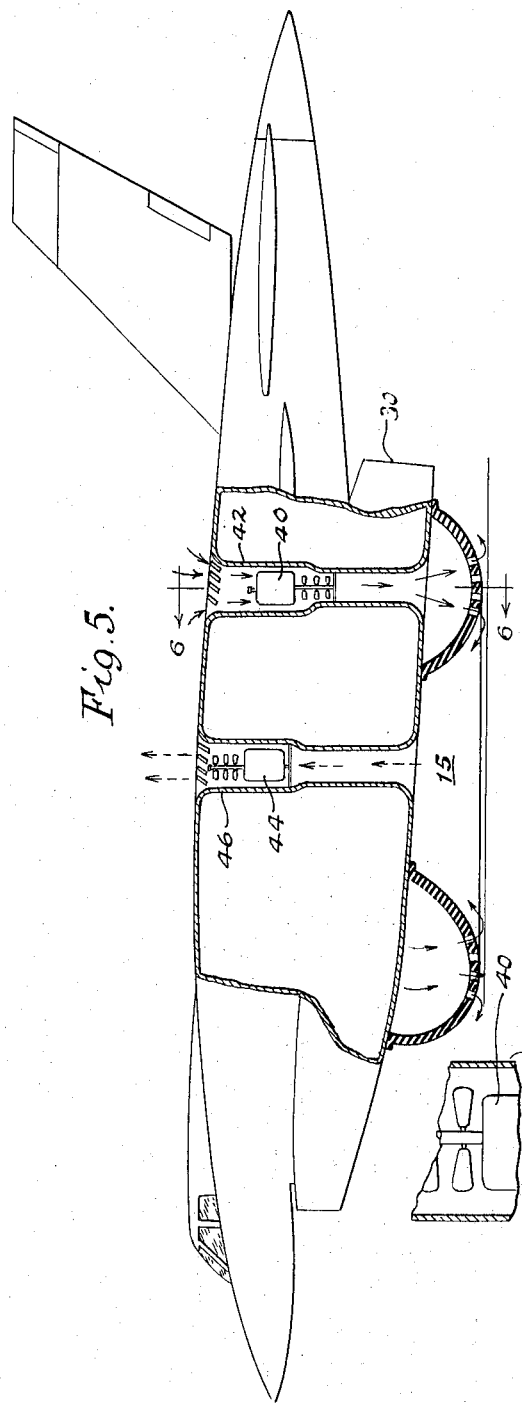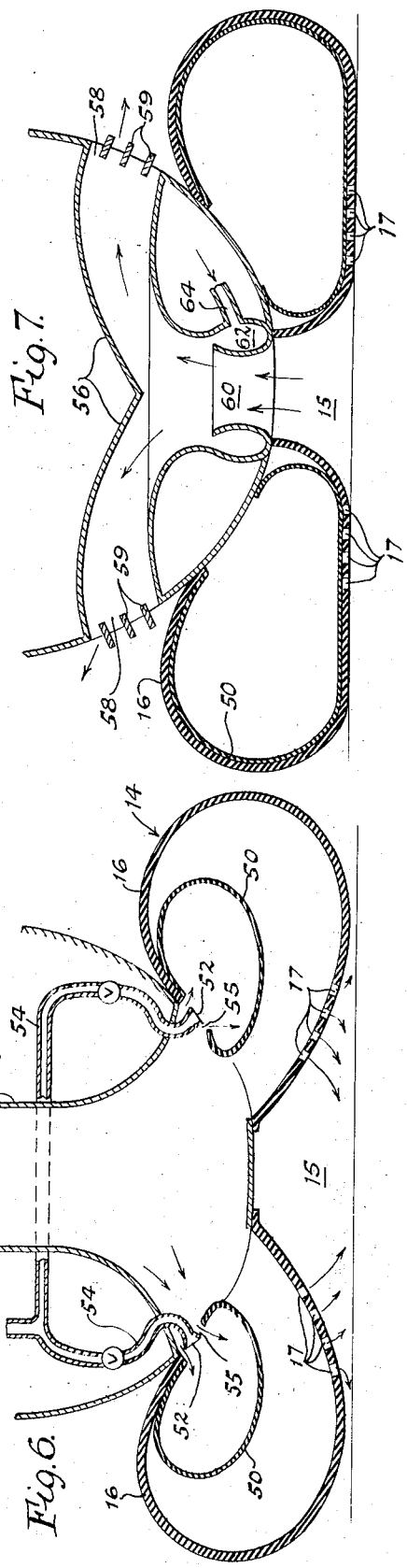

AIR CUSHION TYPE UNDERCARRIAGE

BACKGROUND AND GENERAL DESCRIPTION OF THE INVENTION

The invention relates to improvements in air cushion landing gear systems for aircraft, of the type disclosed for example in U.S. Reissue 26,812 and U.S. Pat. No. 3,524,517; and more specifically to an improved braking/parking subsystem therefor for accelerating the control responses of such subsystems. The system is especially applicable to the problem of acquisition by an aircraft of a suitable landing, and of holding down the aircraft upon a landing surface such as on a ship-board landing pad, and/or on any landing surface such as when exposed to high surface winds. The invention provides an improved system for such purposes requiring no special preparation of the landing surface as compared for example to the solution suggested in U.S. Pat. No. 3,151,826.

As shown herein, one form of the invention involves provision of a flexible bladder(s) disposed interiorly of the air cushion confining trunk system, so as to divide each section of the latter into two separate air receiving chambers; although it is to be understood that in some cases it may be preferred to employ no such bladder. When a bladder is employed superatmospheric air is furnished selectively to the two chambers under control of any suitable (remote, automatic, or manual) pilot control arrangement.

The invention also contemplates that the air supply valve control system will be arranged so that the pilot device (of whatever type) may have selective control available over inflation operations of the trunk and/or bladder units for braking/steering of the aircraft under taxiing conditions.

THE DRAWINGS

The invention is illustrated by way of example by the accompanying drawing wherein:

FIG. 1 is a plan view of an airplane embodying one form of the present invention;

FIG. 2 is a side elevational view thereof;

FIG. 3 is a fragmentary (somewhat diagrammatic) sectional view taken as suggested by line 3—3 of FIG. 2, showing operation of the landing system when the aircraft is in ground-run air-cushion-supported mode, such as when landing or taking off;

FIG. 4 corresponds to FIG. 3 but shows the ground (travel) braking system in operation at both sides of the aircraft;

FIG. 5 is a parti-elevational/longitudinal-sectional view of an airplane illustrating another form of air cushion cavity air supply/withdrawal arrangement for the desired operational control;

FIGS. 6 and 7 are sectional views corresponding to FIGS. 3 and 4 but illustrate modified forms of the invention; and FIG. 8 is a fragmentary view corresponding to a portion of FIG. 2 but showing a modified form of air supply system.

As illustrated by way of example herein, an airplane embodying the invention will typically comprise a fuselage as is illustrated generally at 10 and wing surfaces 12; it being understood that the airplane will also include other suitable components such as engine-propulsion units, tail surfaces, rudder systems, and the like. Also, it is to be understood that in any case the aircraft will be under control of either a manual, automatic, or remote operational (pilot) control system; suitable examples of which are well known in the art.

In accordance with the present invention, the airplane also includes (in lieu of a more conventional wheel type under-carriage system) an undercarriage system of the type disclosed for example in U.S. Reissue Pat. No. 26,812. As shown in said patent, this type undercarriage system will typically comprise one or more toroidal-shaped (or modified toroidal shaped) air inflatable trunk(s) as indicated generally in the drawing herewith at 14; each of which thereby defines an air cushion cavity space 15 circumscribed by the footprint contour of the trunk. Each such trunk device comprises an elastically inflatable cell structure formed of any suitable fluid-tight flexible sheet material as indicated at 16; and therefore may be made of rubber, plastic, or some other suitable or composite fabrication. As shown at FIGS. 3–7, air escape apertures 17 are provided in the sheet material as explained in the aforesaid Reissue patent. As shown at 18—18 (FIG. 1) the trunk system may be partitioned in plan view so as to functionally separate the trunk into two sections lying beneath opposite sides of the aircraft. However, it is to be understood that in plan view the trunk system may (as preferred) be of one, or any other number of sections.

FIGS. 1–2 illustrate an air injection system to inflate the trunk system, whereas FIGS. 2, 3, 4, show means for accelerated withdrawal of air from the air cushion cavity 15. Thus, as shown generally at 20 an air injector system is provided in the form of an open-ended casing 22 carried under the belly of the airplane and having its delivery end portion in communication with the interior of the inflatable trunk system and/or the air cushion cavity. An injection nozzle as indicated at 26 is provided at the inlet of the casing 22; the nozzle device being coupled by means of a conduit 28 to a 3-way valve 29 leading for example from a pressure bleed-off port of the aircraft engine 30 (FIG. 2). Or, in lieu thereof pressurized air may be taken from any other suitable supply source such as an auxiliary compressor, fan, bottle, or the like. In any case, operation of the injection device will be under control of the airplane pilot system, as by means of valve 29, and will induce flow of ambient air into and through the casing 22 into the trunk 14 for inflation thereof and supply of air to the air cushion cavity 15. A check valve as illustrated at 24 (FIG. 2) is provided to prevent undue expulsion of air from the trunk backwardly through the casing 22 such as responsive to a landing impact upon the trunk system.

As illustrated generally at 32 (FIGS. 2, 3, 4) ejector-augmented vent ducts are provided at opposite sides of the airplane for accelerated rate reduction of pressure in the air cushion cavity 15. A compressed air supply nozzle device as indicated at 35 is installed at each of the entrances into the ejector ducts 32, and is coupled to the compressed air supply conduit 28 for selective control by the valve 29 as operated by the pilot control system.

FIG. 5 illustrates another form of trunk inflation and air cushion cavity supply/evacuation control system, wherein an engine-driven fan device as shown at 40 is arranged within an air duct 42 for delivery of pressured air to the trunk system. Another engine fan unit as shown at 44 is disposed within a duct 46 for evacuation of air from the air cushion cavity area 15. The fanmotor unit 44 may be of reversible type, whereby the fan may be used to provide an improved air cushion supply/withdrawal system.

FIG. 6 illustrates how the fan air input as from fan 40 may be directed into the air cushion cavity 15 through the apertures 17, and into the trunk system which includes trunk bladders 50—50 through means of nozzles 52—52. To provide for accelerated inflation of the bladders 50—50 an auxiliary relatively high pressure air supply (which may be of any suitable type known in the art) is arranged to be directed under pilot system control via a conduit system 54 to charge into the bladders so as to induce accelerated delivery of air thereinto from duct 42 through an inlet as shown at 55.

FIG. 7 illustrates utilization of another suitable means for accelerating evacuation of air from the air cushion cavity 15. Such devices are well known and are in the form of an ejection nozzle 60 which is in open communication with the air cushion cavity; and as shown herein is in communication with a bifurcated vent duct 56 discharging to atmosphere at 58—58. The vents 58—58 may be provided with shutter devices or louvers as shown at 59—59. The discharge end of the nozzle 60 is encompassed by a chamber 62 into which relatively high pressure air is directed by means of a conduit 64; the parts being arranged so that the flow of air into the chamber 62 will induce accelerated evacuation of the air cushion.

FIG. 8 illustrates diagrammatically a modified form of the trunk and air cushion cavity inflation system, wherein the casing 22 is extended through the trunk section so as to also deliver into the air cushion cavity. In this case the casing 22 is provided with outlets leading both into the trunk and into the cavity 15; delivery of air into the cavity being further selectively controllable, as by means of a valve 70. Also, as illustrated, the port delivering air from the casing 22 into the trunk system may be provided with an ejector device 72 to provide for accelerated inflation of the trunk system 14.

OPERATION OF THE SYSTEM

As will be understood by reference to the aforesaid Reissue patent, the system as disclosed herein provides for air cushion borne operation of an airplane when involved in landing, taxiing, ground-run or take-off operations as shown in FIGS. 3-7 of the drawing herewith. Note that FIG. 3 of the drawing shows the aircraft operating under pilot system control when the fanpressured air is being delivered at equal pressures from the fan into the trunk system at opposite sides of the airplane. Air exits through the trunk apertures 17 so as to pressurize the air cushion cavity 15; thereby providing air cushion support for the vehicle as well as air-lubricated support of the trunk fabric relative to the landing surface. In this case all vent control valves would be closed, whereby the entire engine-fan output is efficiently applied to the air cushion support operation.

FIG. 4 illustrates how the forward run of the airplane may be braked incidental to settling down upon an appropriate landing surface. Also, how a VTOL type aircraft may pull itself down to "acquire" a firm landing thereon. As shown therein, the shutters of the vent ducts 32—32 have been opened for venting air from the cushion cavity to ambient atmosphere. To decelerate the ground-run the evacuation augmentation nozzle device 35 may be pilot-system-actuated, as explained hereinabove.

FIGS. 6–7 illustrate adaptation of the invention to another form of inflatable trunk system, wherein each trunk section contains its own separately inflatable bladder. FIG. 6 shows the aircraft in airborne mode, such as during a ground-run or taxiing operation. Note that the bladders are partially inflated, while air flows through the trunk sheet apertures 17, thereby supplying the air cushion cavity and providing the requisite air cushion support. For ground-run braking purposes the bladders are inflated so as to expand into conformity with the inner walls of the trunk members as shown in FIG. 7. The air escape apertures 17 are thus sealed off by the bladders, thereby discontinuing supply of air to the air cushion cavity; whereupon the aircraft settles down into trunk friction contact with the landing surface. To increase the braking effect, evacuation of the air cushion cavity may then be accelerated by pilot-controlled delivery of highly compressed air through the conduit 64 to the nozzle 60 (FIG. 7).

Also it should be noted that the trunk and bladder chambers at opposite sides of the airplane may be arranged to be separately inflated/deflated. The pilot system is thereby provided with means for selective control of the braking system, and may instantaneously obtain any desired differential braking effects for facilitating directional control of the aircraft during ground-run/braking maneuvers.

As previously stated, FIG. 8 illustrates a system wherein a portion of the pressured air delivery may be directed into the air cushion cavity under control of the aircraft pilot system by means of the valve 70; whereby it will be understood that the pilot system is provided with still another optionally available air cushion lift effect control.

Thus, it will be understood that the system of the invention provides an improved operational control facility including capability, under pilot system control, for acquiring a landing and at least temporarily holding the aircraft in static condition on a landing surface under adverse conditions; such as in the face of cross-winds or pitching/rolling of the landing surface as in the case of an aircraft carrier or any other type shipboard landing pad.

I claim:

1. An undercarriage system for aircraft providing improved ground-run deceleration and landing acquisition and temporary hold-down operational characteristics, said system comprising in combination, an air inflatable trunk member attached to said aircraft and adapted to be inflated so as to balloon-out from thereunder to define an air cushion cavity for air cushion type support of the craft relative to a reaction surface, said trunk member being formed of flexible airtight sheet material adapted to extend in response to internal air pressure into a shape of prescribed form and dimensions, means for supplying pressurized air into said trunk member and into said air cushion cavity, and braking/hold-down means under control of the pilot system of said aircraft for positively exhausting air from said cavity at a rate greater than the rate of air supply thereinto.

2. An aircraft having an undercarriage system of the air cushion type as set forth in claim 1, wherein said braking/hold-down means includes air escape conduit means leading through said aircraft to atmosphere from said air cushion cavity for escape of air from said cavity at a rate greater than the rate of air supply into said cavity, and means operable by the pilot system of said aircraft for controlling the rate of escape of air through said conduit means from said air cushion cavity.

3. An aircraft as set forth in claim 2, wherein said braking/hold-down means includes an auxiliary air supply means under control of the pilot system of said aircraft to provide for exhausting air from said air cushion cavity at rates greater than the rate of supply of air thereto.

4. An aircraft having an undercarriage of the air cushion type as set forth in claim 1, wherein said trunk member is formed with apertures along lowermost surface portions thereof, and wherein a device formed of airtight flexible sheet material is disposed interiorly of said trunk member and is adapted to be displaced within said trunk member so as to seal off said apertures, and wherein means are provided for directing supplies of air at superatmospheric pressure into said trunk member and against said device, and wherein valve means are provided under control of the aircraft pilot system for independently and selectively regulating the rates of supplies of pressured air into said trunk and against said device.

5. An aircraft as set forth in claim 1, wherein said trunk member is formed of elastic airtight sheet material.

6. An aircraft as set forth in claim 1, wherein said aircraft includes a longitudinally extended fuselage structure and said undercarriage trunk member is structurally divided so as to provide at least two functionally separate trunk sections disposed to extend beneath opposite sides of the aircraft fuselage, and wherein the pilot system of said aircraft is operable to separately and selectively provide for supplies of pressurized air at various rates to the separate sections of said trunk member.

7. An aircraft as set forth in claim 6, wherein said aircraft pilot system includes means for selectively modifying the rates of escape of air from said trunk sections respectively.

8. An aircraft as set forth in claim 2, wherein said valve means regulating the rate of escape of air from said air cushion cavity are located relative to said conduit means so as to comprise weather-seal means therefor.

9. An aircraft having an undercarriage system as set forth in claim 1 wherein an air conduit is provided leading through said aircraft to atmosphere from said air cushion cavity for flow of air to and from said cavity, and air pump means are disposed in association with said conduit under control of the aircraft pilot control system for regulating the rates of air flow through said conduit to and from said air cushion cavity.

* * * * *